Nov. 12, 1963 R. C. HILLIARD 3,110,842
DEVICE FOR ATTENUATING MICROWAVE ENERGY
Filed Aug. 29, 1960

INVENTOR.
Robert E. Hilliard
BY
Alexander and Slater
Attys.

United States Patent Office 3,110,842
Patented Nov. 12, 1963

3,110,842
DEVICE FOR ATTENUATING MICROWAVE ENERGY
Robert C. Hilliard, Beverly Farms, Mass., assignor to Microwave Electronic Tube Company, Inc., Salem, Mass., a corporation of Delaware
Filed Aug. 29, 1960, Ser. No. 52,651
8 Claims. (Cl. 315—39)

This invention relates to electronic components, more particularly it relates to a novel structure for attenuating microwave power and to an improved microwave frequency transmit-receive shutter tube.

Equipment which utilizes microwave radio frequency energy, that is, radio frequencies between approximately 1 kmc. and 75 kmc., also known as the ultra high and very high frequency range, must protect the sensitive receiving equipment from high energy pulses. Such microwave equipment is, among other purposes, installed in aircraft for navigation, search, fire control, and weapon guidance; in ship and shore installations for search, fire control, missile guidance, and IFF devices, and in missiles for guidance, control and telemetering links. One variety of microwave systems of the kind referred to here are termed radar systems and are comprised of an antenna, used for both sending and receiving radar pulses, a high power signal transmitter, a sensitive low power receiver, and switching means contrived to prevent high power signals from finding a way directly into the receiver. The power handling capacity of the sensitive radar signal receivers is limited, and if the incoming signal power exceeds the rated capacity of the receiver the crystal detector as well as other sensitive receiver components may be damaged.

During transmission of the high power pulse, ionization of a gas contained within a resonant cavity of the TR tube decouples the sensitive receiver from the remainder of the system. The TR tube is mounted in the system so that essentially all of the returning reflected microwave signal is transmitted through the tube to the receiver; the low power reflected signal being below that potential required to ionize the gas in the resonant cavity.

Directly beamed stray radio frequency energy from other radar sets in the vicinity picked up by the antenna and propagated through the system, even when the set is turned off, is a source of possible damage to the sensitive receiver. In order to protect radar equipment when it is idle and not powered numerous mechanical shutters have been devised which short the wave guide and greatly attenuate the RF signal which leaks through to the receiver. Despite the presence of a shorting bar in the shutter tube a not inconsiderable quantity of RF power passes through a conventional shutter tube. Leakage currents from stray radar signals are sufficient under readily encountered circumstances to cause damage to the receiver.

It is convenient to combine the TR tube for microwave power switching and the shutter tube for microwave power attenuation in one envelope to effect savings in weight and size. Such double purpose tubes are now widely used. The characteristics of multiple resonant element tubes in microwave systems is extensively discussed in the open literature, in particular "Microwave Duplexers," by Louis D. Smullin and Carol G. Montgomery, New York, 1948, describes the properties of various geometric resonant structures used in switching and attenuating RF signals.

Even though numerous alternative devices for switching an attenuating microwave energy have been disclosed, no practical device has heretofore been disclosed that reduces leakage power past a shorting bar or an ionization gap which utilizes the energy of the incoming signal to limit the passage of leakage currents, and yet permits the passage of impinging low intensity signals with negligible attenuation.

One object of my invention is to provide a novel reliable means for attenuating high intensity microwave energy.

Another object of my invention is to provide signal attenuation in a wave guide utilizing means for coupling an electromagnetic field with a reverse field of the same frequency.

Still another object of my invention is to provide a novel and a superior TR shutter tube.

Yet another object of my invention is to provide a TR shutter tube which exhibits negligible leakage of RF energy past the closed tube.

These and other objects and advantages of my invention will be apparent from the following drawings, descriptions, specifications and claims.

My invention comprises briefly a device for attenuating microwave energy in a wave guide comprising a section of wave guide, a band pass diaphragm having a first side and a second side mounted in a transverse plane of the wave guide, and conducting means mounted upon the diaphragm coupling the electromagnetic field on the first side of the diaphragm with the reverse field on the second side of the diaphragm. My invention is normally used in combination with conventional elements found in a TR shutter tube. Accordingly, the scope of my invention comprises TR and shutter tubes having in combination conventional switch and attenuation structures with the diaphragm vanes and my novel conducting means mounted thereon for coupling the reverse electromagnetic fields on opposite sides of the diaphragm. Specific embodiments are illustrated and specified, and the definition of the scope of my invention is set forth below.

Figure 1:
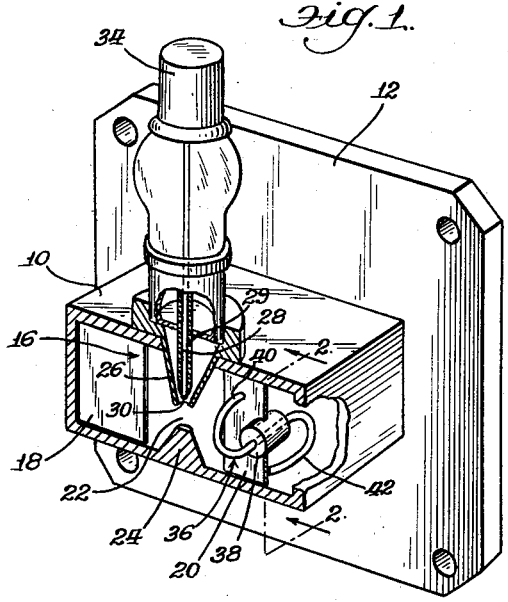
FIGURE 1 is a preferred embodiment of my invention shown in a cut away view of a TR tube.

Referring now to FIGURE 1 of the drawings wherein is illustrated a section of wave guide 10 terminating in a wave guide coupling 12 having a conventional resonant window 14 and a band pass diaphragm 16 comprised of two symmetrical vanes 18 and 20 positioned in a transverse plane of the wave guide. Mounted between the edges of the vanes 18 and 20 is an ionization gap 22 formed of the juxtaposition of a truncated cone 24 integral with the lower wave guide wall and a hollow truncated cone 26 integral with the upper wall of the wave guide. A keep alive electrode 28 having an insulating glass coating 29 along the sides thereof is mounted coaxially in the interior of the hollow cone 26, positioned so that the tip 30 without the insulating glass coating protrudes just beyond the end of the hollow cone 26. The upper end of the keep alive electrode 28 is electrically connected to an insulated terminal 34. Although not shown in FIGURE 1 as a gas tight envelope, the wave guide section 10 is sealed on the near end by a coupling flange similar to the coupling flange 12, and all joints between the various components are metallurgically sealed. A small quantity of gas such as nitrogen, argon or Freon at a pressure of from .01% to 5% of an atmosphere is sealed within the gas tight wave guide section. The gas composition and gas pressure is selected in accordance with well known principles which relate ionization potential to the composition of the gas and pressure of the gas; the voltage at which the tube is to fire or ionize may be preselected and the gas pressure within the envelope adjusted accordingly at the time the tube is sealed.

Figure 2:
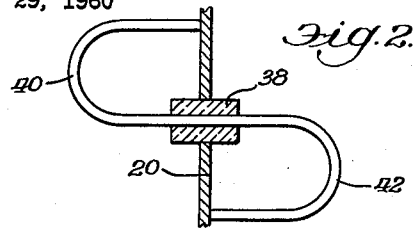
FIGURE 2 is a cross sectional view of the vane and conducting means mounted thereon taken on line 2—2.

Despite the electrical short which the ionized gases create in the tube upon application of a high power signal considerable RF energy leaks past the ionization gap. In order to control this leakage, I have inserted a wire probe 36 through the van 20. The probe or conducting means 36 is mounted in an electrically insulating bushing 38. The probe is a conducting wire having a loop 40 extending approximately ¼ wave length beyond the first or near side of the vane 20 and through the bushing to the second or far side of the vane terminating in a similar loop 42 which extends approximately ¼ wave length beyond the surface of the vane 20 but in the reverse direction of rotation. The reverse loops 40 and 42 are electrically connected and at all times bear the same potential. When a high intensity signal enters the wave guide 10 the ionization gap fires, and the near side loop 40 has impressed upon it a current proportional to the power of the signal. The current flowing in the loop 40 imposes a high potential field upon the reverse loop 42. The small intensity RF wave which passes the ionization gap, is one half wave length down the axis of propagation from loop 40, and therefore, 180° out of phase electrically with the field impressed upon the loops 40 and 42. The reverse field formed about the loop 42 acts to cancel the leakage wave resulting in substantial attenuation of the leakage signal. Attenuation due to the action of one set of reverse loops such as illustrated in FIGURES 1 and 2 have exceeded 25 db. RF power attenuation of strong signals in specific embodiments of my invention has been observed as 90% and more of the incoming signal power.

Figure 3:
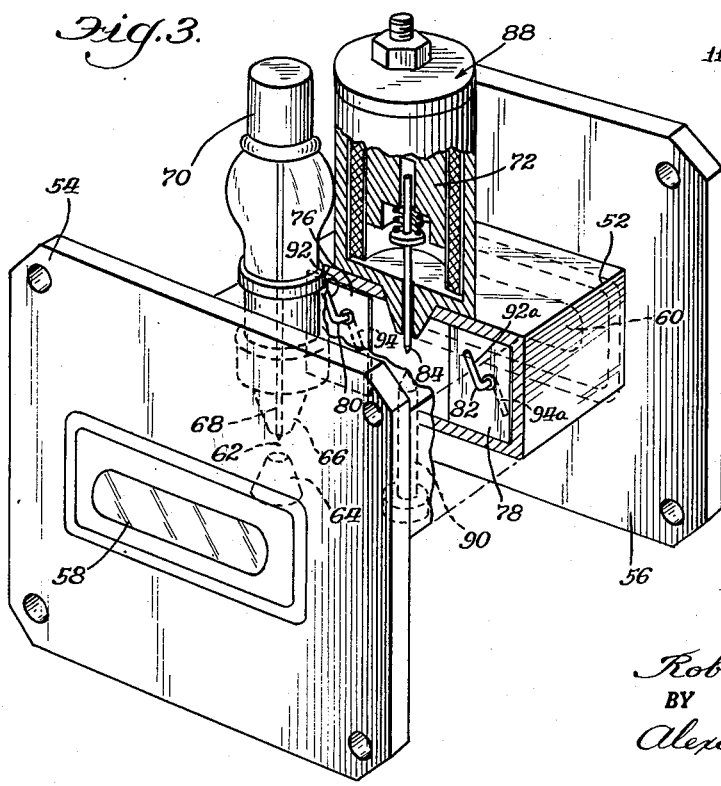
FIGURE 3 is another embodiment of my invention shown in combination with conventional component parts of a TR shutter tube in a partly cut away perspective view of such a tube.

FIGURE 3 is a partly cut away perspective view of a TR shutter tube 50 in which my invention has been adapted to attenuate RF leakage past a solenoid operated shutter bar. The tube comprises a section of wave guide 52, coupling flanges 54 and 56, each of which support resonant windows 58 and 60; these members form a gas tight envelope into which has been mounted a conventional ionization gap 62 comprised of a lower truncated cone 64, an upper hollow truncated cone 66, a coaxial keep alive electrode 68 and an electrically insulated terminal 70 for the electrode 68 positioned exteriorly of the wave guide 52. In addition, there is mounted within the wave guide a solenoid operated shutter 72, a band pass diaphragm 74 comprised of vanes 76 and 78, and conducting means 80 and 82 mounted through the vanes or insulating bushings and adapted to couple the reverse fields on the two sides of the vanes. The shutter is comprised of a shorting bar 84 which is spring loaded at 86 and positioned at its upper end within the core of a conventional solenoid 88. A threaded adjustable contact rod 90 extends through the lower wall of the wave guide and completes the shutter.

The vanes 76 and 78 form a band pass diaphragm as well as a mounting for the conductors 80 and 82. These conductors are adapted to attenuate the leakage currents which may pass the shutter 84 in its closed position. The conductors comprise two probes 92 and 94 and 92a and 94a. The probes 92 and 94, and 92a and 94a are electrically connected respectively, and positioned to interact inductively to cancel the weak field of the leakage signal on the far side of the vanes with the energy supplied by the reverse strong field of the impinging signal on the near side of the vanes.

Figure 4:
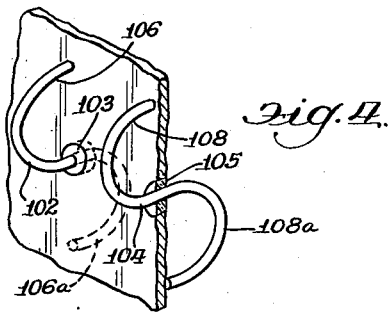
FIGURE 4 is a fragmentary view in perspective of a typical diaphragm vane used in a conventional TR shutter tube showing yet another embodiment of my invention adapted for mounting thereon.

FIGURE 4 illustrates an alternate embodiment of my invention comprised of two wire loop conductors 102 and 104 each having reverse loops 106 and 106a, and 108 and 108a respectively on opposite sides of the vane 110 shown in fragmentary form. The application of plural conductors on one vane such as shown in FIGURE 4 strengthens the induced field on the far side of the vane and heightens the attenuation of the leakage RF fields.

Figure 5:
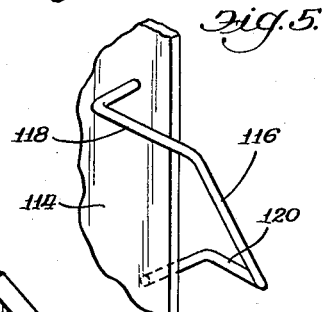
FIGURE 5 is a fragmentary view in perspective of a typical diaphragm vane used in a conventional TR shutter tube showing still another embodiment of my invention adapted for mounting thereon.

FIGURE 5 illustrates still another embodiment of my invention. A vane 114 is shown in fragmentary form and for normal use would be mounted in a TR or shutter tube similar in all respects to those vanes mounted in wave guide sections as shown in FIGURES 1 and 3. A conductor 116 extends from a first or near side of the vane 114 outward to form a loop 118 approximately ¼ wave length then curves downward at approximately a 45° angle, extends beyond the edge 122 of the vane 114 and curves back in a reverse loop 120.

Figure 6:
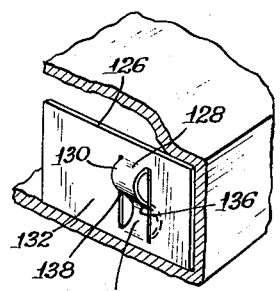
FIGURE 6 is a fragmentary view of yet another preferred embodiment of my invention.

FIGURE 6 comprises still another embodiment of my invention. A band pass vane 126 is mounted in a section of wave guide similar to the structures illustrated in FIGURES 1 and 3; only a fragmentary view of the wave guide envelope is shown and only one vane of the conventional two vane band pass structure is shown in FIGURE 6. Attenuation of a strong RF signal which passes the vane 126 is accomplished by the reverse loop formed of a strip of metal 128 cut from the vane 126 and formed into a first half circle loop 130 on the near side of the vane 126, as shown in FIGURE 6, and a second half circle loop 134 formed in the reverse direction and extending beyond the far side of the vane 126, as pictured in FIGURE 6. The radius of curvature of the loops 130 and 134 are approximately ¼ wave length of the RF signal which the supporting wave guide structure will propagate.

The strip of metal 128 is separated from the vane along its sides by spaces 136 and 138 provided to prevent shorting by the vane of the induced current on the input metal loop 128. The strip 128 may be described as an S-shaped curve joined to the vane 126 at its extreme ends and positioned so that each of the half circle curves extends beyond the respective sides of the vane. The function of the strip 128 contoured to constitute two electrically connected reverse mounted half loops positioned to effect electrical cancellation of RF power on opposite sides of the supporting vane operate similarly to the embodiments described above and illustrated in FIGURES 1, 3, 4 and 5.

The foregoing specific embodiments and description of my invention are intended as merely illustrative, the scope of my invention is limited only by the following claims.

The invention is hereby claimed as follows:

1. An improved TR shutter tube comprising a section of wave guide, vanes having a first side and a second side mounted in a transverse plane of the wave guide, truncated cones mounted within the wave guide to form a resonant gap, a coaxial keep alive electrode projecting into the wave guide through one of the cones, a spring loaded solenoid operated shorting bar positioned in the transverse plane of the vanes and adapted to short the wave guide when the solenoid is not powered, and conducting means mounted on the vanes and extending through and beyond both sides of the vanes in spaced relationship whereby leakage RF energy which passes the transverse plane is attenuated by cancellation of the fields by the action of the conducting means which couple the reverse strong RF field impinging on the first side of the vanes to the weak RF leakage field on the second side of the vanes.

2. The device of claim 1 wherein the conducting means are mounted through an insulating bushing in the vanes and comprise plane wire loops, the planes of which are perpendicular to the said transverse planes, the loops extending in spaced relationship to the first and second sides of the vanes respectively.

3. The device of claim 1 wherein the conducting means are wires extending one quarter wave length outward and upward from the first side of the vanes and extending one quarter wave length outward and downward from the second side of the vanes.

4. A microwave frequency shutter tube comprising a gas tight envelope having a wave guide section, reasonant windows mounted at the ends of the wave guide section, two vanes mounted within the wave guide in a single transverse plane, two truncated cones mounted between the vanes in the transverse plane and in spaced relationship to form a resonant gap, a shutter bar moveably mounted coaxially in one truncated cone and adapted when the tube is shut to extend across the gap to make electrical contact with the opposite truncated cone, and conductors mounted to pass through the vanes and extend in spaced relationship to the vane surfaces whereby the electromagnetic field on one side of the vanes is coupled through the conductors to the reverse field on the other side of the vanes and accordingly attenuates the microwave energy.

5. An improved TR shutter tube comprising a section of rectangular wave guide, the wave guide having a shorter side parallel to E field lines of signals propagated therethrough and a longer side parallel to H fields of signals propagated therethrough; vanes having a first side and a second side mounted in a transverse plane of the wave guide; a first and a second truncated cone mounted within the wave guide and in the transverse plane positioned to form a resonant gap between the truncated cones; a hollow recess within the first cone; a shorting means movably mounted within the hollow recess and adapted, upon movement, to electrically contact the second cone; and curved elongated electrically conducting means mounted on the vanes and extending through and beyond both sides of the vanes in spaced relationship, the conducting means being curved respectively to lie in one plane, mounted with the plane of curvature of the conductor perpendicular to the vanes respectively and parallel to the shorter side of the rectangular wave guide; whereby leakage RF energy which passes the transverse plane is attenuated by cancellation of the field by the action of the conducting means which couple the reverse strong RF field impinging upon the first side of the vanes to the weak RF leakage field on the second side of the vanes.

6. The improved TR shutter tube of claim 5 wherein the elongated conductors are each comprised of a length of wire having two half loops forming an S, the wire mounted on the vane, one loop thereof extending beyond the first side of the vane and the second loop extending beyond the second side of the vane.

7. The improved TR shutter tube of claim 5 wherein the elongated conductors are each comprised of metal strips cut from the vane, mounted in electrical contact at either end of the strip to the vane, the strips being parallel to the shorter side of the rectangular wave guide and curved in an S-shaped curve comprised of two half loops disposed with a first half loop extending in spaced relationship from the first side of the vane and the second half loop extending in spaced relationship from the second side of the vane.

8. The improved TR shutter tube of claim 5 wherein the elongated conductors are comprised of lengths of wire having a first end and a second end, respectively, the conductors being mounted to the respective vanes, the first end of a conductor being mounted to the first side of a vane and the second end of the conductor being mounted to the second side of the vane, the conductor wire passing around the edge of the vane into the region of the resonant gap.

References Cited in the file of this patent

UNITED STATES PATENTS

| | | |
|---|---|---|
| 2,448,623 | Rose | Sept. 7, 1948 |
| 2,798,206 | Baroch | July 2, 1957 |
| 2,816,272 | Braden | Dec. 10, 1957 |
| 2,897,458 | Berkowitz | July 28, 1959 |
| 3,012,170 | Heil | Dec. 5, 1961 |